United States Patent [19]

Dessing et al.

[11] Patent Number: 5,379,721
[45] Date of Patent: Jan. 10, 1995

[54] AUTOMATIC MILKING APPARATUS

[75] Inventors: Jacobus P. M. Dessing, Nieuw-Vennep; Pieter J. Roodenburg, Lelystad; Erik A. Aurik, Amsterdam; Fokko P. Borgman, Witteveen, all of Netherlands

[73] Assignee: Prolion B.V., Netherlands

[21] Appl. No.: 85,687

[22] Filed: Jun. 25, 1993

Related U.S. Application Data

[60] Continuation of Ser. No. 701,172, May 16, 1991, abandoned, which is a division of Ser. No. 294,794, Jan. 9, 1989, Pat. No. 5,020,477.

[30] Foreign Application Priority Data

Jan. 8, 1988 [NL] Netherlands .................. 8800042
Feb. 4, 1988 [NL] Netherlands .................. 8800272
Jul. 13, 1988 [NL] Netherlands .................. 8801785

[51] Int. Cl.⁶ .................................. A01J 3/00
[52] U.S. Cl. ....................... 119/14.08; 119/14.14; 364/167.01
[58] Field of Search ............ 395/80, 88, 93, 94; 318/568.1, 568.11, 568.14, 568.16, 568.18; 901/46; 364/167.01, 174, 191, 148; 119/14.08, 14.01, 14.18, 14.02, 14.14

[56] References Cited

U.S. PATENT DOCUMENTS

| 4,011,437 | 3/1977 | Hohn | 364/174 X |
| 4,380,696 | 4/1983 | Masaki | 395/88 X |
| 4,492,847 | 1/1985 | Masaki et al. | 395/94 X |
| 4,558,424 | 12/1985 | Oguchi et al. | 395/94 |
| 4,639,878 | 1/1987 | Day et al. | 364/191 X |
| 4,726,322 | 2/1988 | Torsius | 119/14.14 |
| 4,748,936 | 6/1988 | Hogen Esch | 119/14.02 |
| 4,867,103 | 9/1989 | Montalescot et al. | 119/14.08 |
| 4,907,169 | 3/1990 | Lovoi | 395/94 |
| 4,941,433 | 7/1990 | Hanauer | 119/14.02 |
| 4,942,538 | 7/1990 | Yuan et al. | 395/94 |

Primary Examiner—Roy N. Envall, Jr.
Assistant Examiner—Steven R. Garland
Attorney, Agent, or Firm—Watson, Cole, Grindle & Watson

[57] ABSTRACT

An automatic milking device employs a robot arm, a sensor and a control system for searching for, finding and following the teats on the cow's udder. The control system employs a model to provide corrected position information for comparison with sensed position information so that a selection may be made based upon stored criteria.

12 Claims, 15 Drawing Sheets

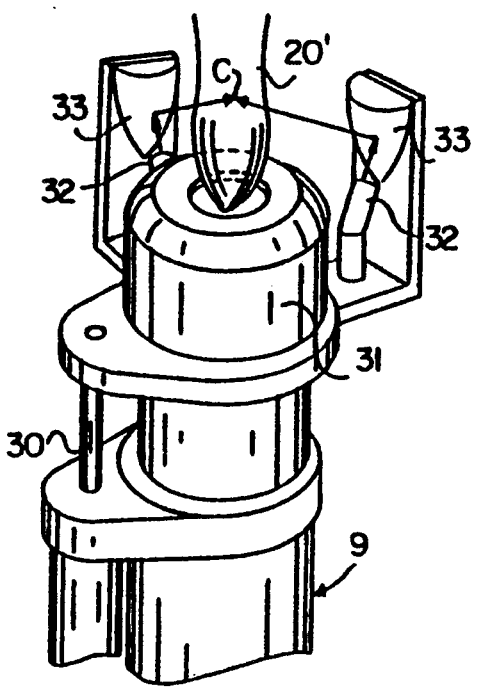
FIG. 5
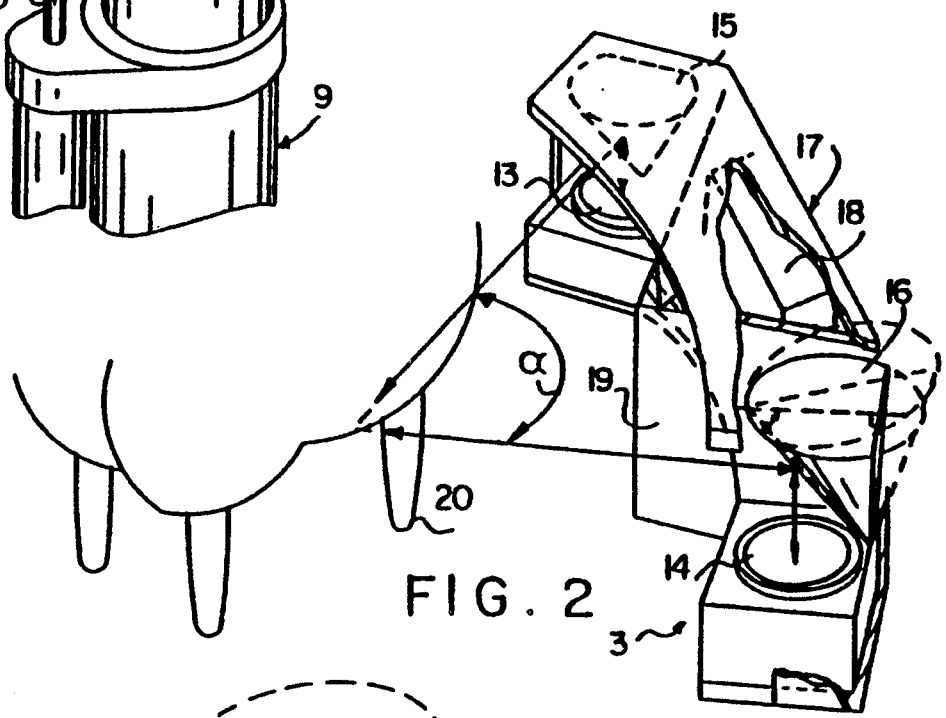
FIG. 2
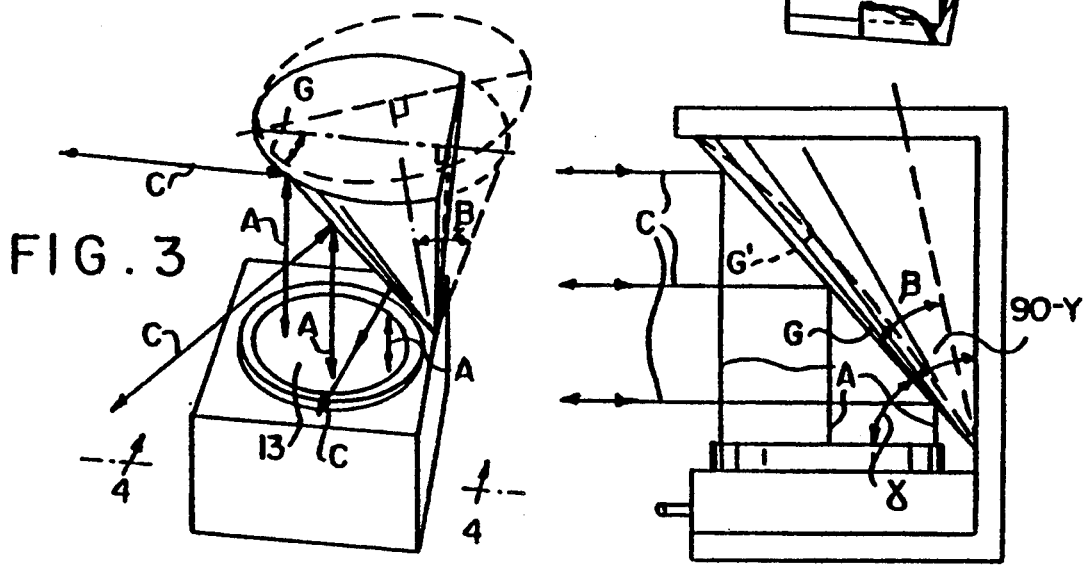
FIG. 3
FIG. 4

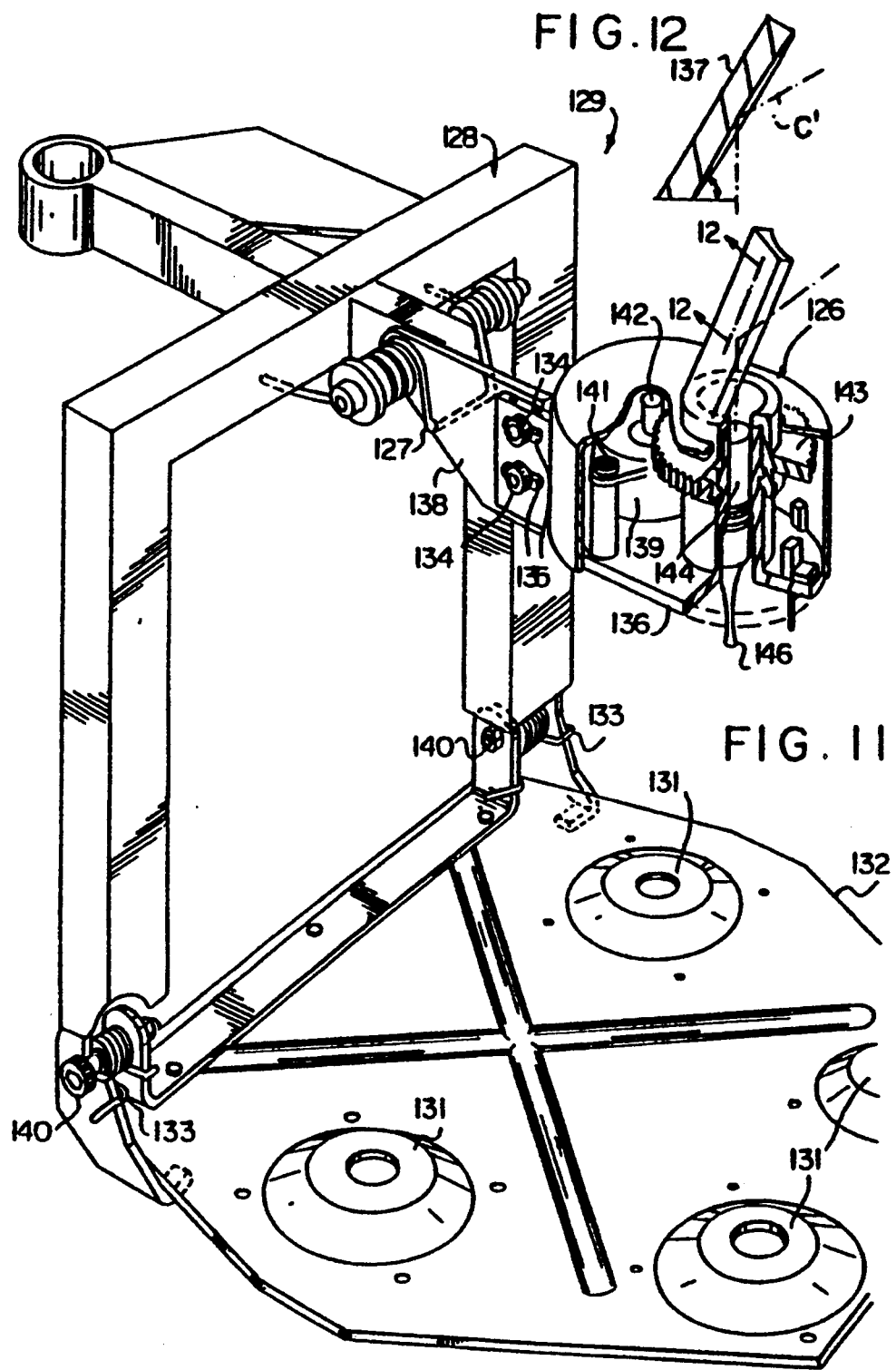

AUTOMATIC MILKING APPARATUS

This is a continuation of application Ser. No. 07/701,172 filed May 16, 1991, now abandoned, which in turn is a division of application Ser. No. 07/294,794, filed Jan. 9, 1989, now U.S. Pat. No. 5,020,477.

A primary aspect of the present invention relates to an ultrasonic detector.

Ultrasonic detector equipment for automatic milking devices is described in the European patent application 232.568 from the same applicant. A problem in this known system is the obtaining of a detection field that is accurately determined with respect to height, while in the plane defined by the height the widest possible bundle has to be generated in order to be able to search for, find and/or approach a cow's udder provided with a teat.

An ultrasonic detector has for its object to improve upon the known prior art. Further this ultrasonic detector solves the above problem.

A further aspect of the present invention relates to a method for searching for a moving object.

Existing robot systems, such as published in EP-A-232568, EP-A-213660 and EP-A-209202, for seeking, finding and/or following a (moving) object forming part of a greater entity have been found to be incapable of meeting requirements in respect of reliability, speed and/or possibilities for error correction.

This further aspect of the present invention has for its object to improve upon the above mentioned prior art. Further it is an object of the present invention to obviate the above mentioned drawbacks.

By making use, as in accordance with the method of the invention, of position and speed information, a more accurate determining of position is achieved and information is obtained related to the pattern of movement of the (moving) object; information concerning speed in the case of violent movements will also be available.

With the method according to the invention information is obtained concerning errors and/or other irregularities either in the measuring process or the control process or in the movements of the object.

A further aspect of the present invention relates to an ultrasonic sensor unit.

Ultrasonic sensor units are much used in industrial and agrarian environments as they are not very sensitive to dirt and are robust.

Ultrasonic sensor units for use in agriculture are described in the European patent applications EP-A-0 213 660, EP-A-0 232 568 and EP-A-0 270 165.

The above publications all describe sensors for use in automatic milking devices, and more specifically for seeking and following the udder and/or teat of a cow.

By moving the transducer relative to an ultrasonic mirror the area for scanning is varied, for example made larger or smaller. Thus for example in the case of a conical reflection surface, this conical reflection surface can be moved down or upward so that a narrower or wider bundle results.

In preference however the sensor unit is employed so that it becomes possible to scan an area around the transducer and by moving the mirror only through a determined angle or by stopping the rotating ultrasonic mirror, it is possible to scan a more or less restricted circle segment. In order to follow a particular teat the reflection surface will often be brought to a stop.

A further aspect of the present invention relates to an element for positioning an animal.

Such an element is to be used especially in an automatic milking system in which it is important to position an animal in an exactly defined position before automatically applying teat cups.

Another aspect of the present invention relates to a terminal apparatus to be used at an automatic milking system, in which a farmer can easily control functions of the milking system.

Furthermore, yet another aspect of the present invention relates to a method for automatically applying teat cups.

BRIEF DESCRIPTION OF THE DRAWINGS

Further advantages, features and details of the present invention will be clearified with reference to a drawing in which:

FIG. 2 shows a schematic, perspective view of detail II from FIG. 1;

FIG. 3 shows detail III from FIG. 2;

FIG. 4 shows a side view from the line IV—IV from FIG. 3; and

FIG. 5 shows detail V from FIG. 1.

FIG. 11 shows another preferred embodiment of the ultrasonic sensor unit according to the present invention;

FIG. 12 shows a section along the line XI—XI from FIG. 11.

DETAILED DESCRIPTION OF THE INVENTION

Figure 1:
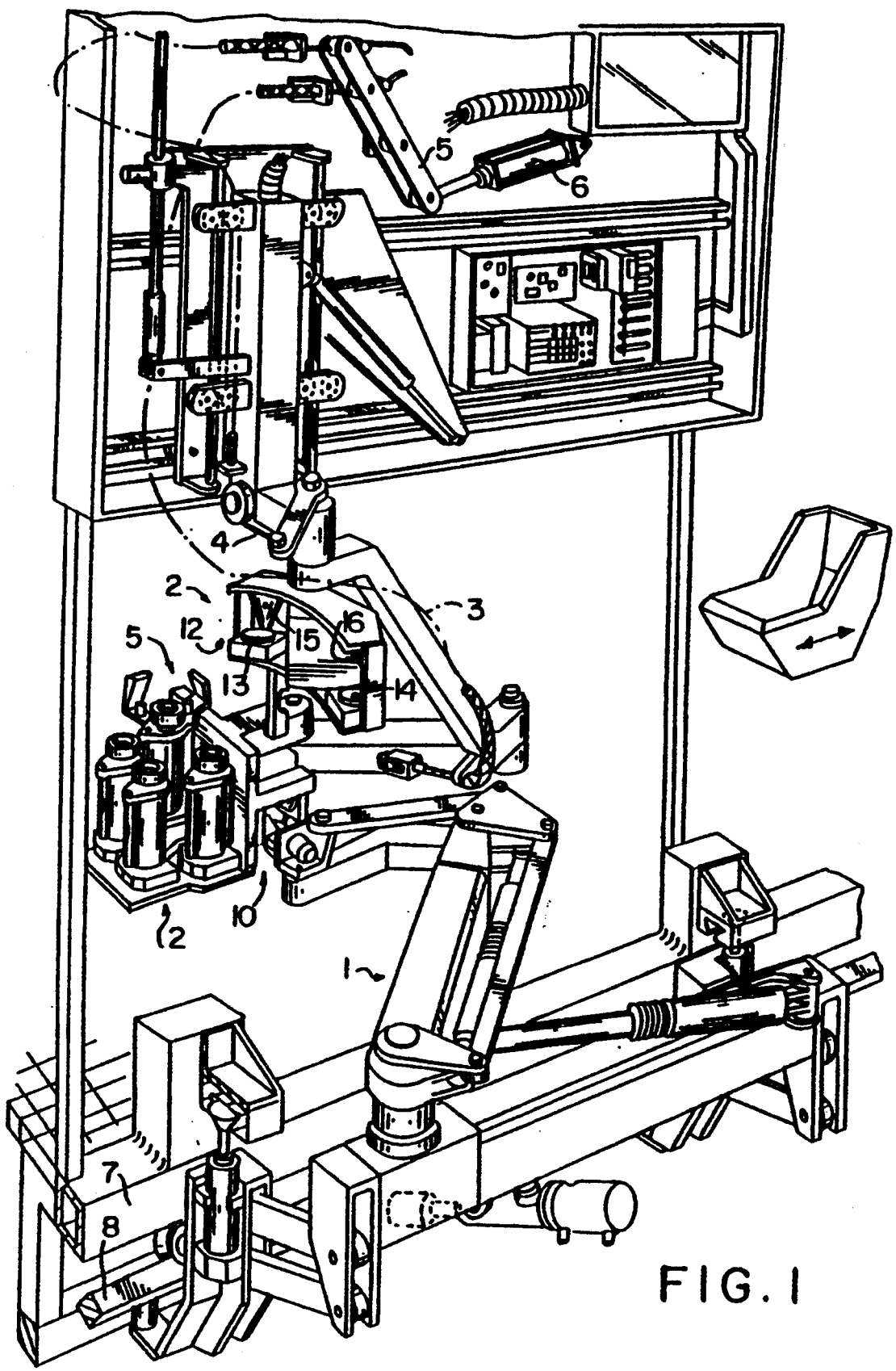
FIG. 1 shows a perspective view of an automatic milking device, in which an ultrasonic detector according to the present invention is employed.

Mounted on the milking rack 2 are four milking cups 9, as described in EP-A-232.568. A gripper member 10 of the milking robot 1 grips onto the milking rack 2 and can move it three-dimensionally.

Arranged above the milking cups 9 is a sensor assembly 12 which comprises two (or more) ultrasonic transmitter/receiver units 13 and 14—per se known—and arranged above them the respective cones 15 and 16 (FIG. 2), preferably made of plastic. An example of signal processing of signals coming from ultrasonic sensors is described in EP-A-232.568.

Present in a housing 17 for the sensors is a space 18 for accommodation of the electronics, these electronics being connected in a manner not shown to a central control unit. The cones 15, 16 and the housing 17 are preferably of aluminium or plastic—the cone surfaces polished smooth—so that the transmitter/receiver unit is robust, dirt-resistant and cannot rust.

If the transmitter/receiver units 13 and 14 are disposed at a mutual angle $\alpha$ of for example 50°, a detection field is created whereby one teat can be located without the sensor units 'hearing' one another's detection field; in order to avoid this cross over a screen 19 of sound-damping material can be attached to housing 17.

It is also possible to use a transmitting member and two or more receiving members at the same time. In this case it is also possible to scan two teats simultaneously.

In the preferred embodiment shown the cone pieces 15, 16 are mounted on the housing, for instance with adhesive.

Bundles of ultrasonic waves transmitted and received as according to arrows A by a transmitter/receiver unit 13 (FIG. 3, 4) form a broad bundle as indicated with the arrows C. The half top angle $\beta$ of the cone amounts preferably to roughly 35°, while the cone is preferably disposed in slightly forward inclined position so that a generatrix G of the cone surface makes an angle $\gamma$ of approximately 45° with the transmitter/receiver unit 13.

Through variation of the half top angle $\beta$ of the cone and/or the distance between the cone and the sensor, the area and/or shape of the field can be adjusted.

The detection field will be rather flat and have the shape of a projection of a cigar.

If there is a slight deviation from the cone shape, for instance a generatrix G' has a slightly concave form, the height of the detection field—the distance between the bundle lines C—can thus be set. A generatrix G" may also have a slightly convex form.

By variation of the angle $\gamma$ the principal direction of the field can be adjusted to the position of the sensor.

Via a piston rod 30 (FIG. 5) a top piece 31 of the milking cup 9 can automatically be moved upward, while the position of a milking cup relative to a teat 20' can be corrected using ultrasonic transmitter/receiver units 32 arranged close to at least one milking cup. The ultrasonic waves are thereby directed against an ultrasonic mirror surface 33 to a point of intersection C' where the teat has to be located in order to be able to place the top piece 31 around it in the correct manner. The mirror surface 33 consists in preference of a conical surface as shown in FIGS. 3 and 4, whereby however a generatrix has a slightly convex form in order to obtain a bundle that is also broadened in height.

The present invention is not limited to the above described embodiment, in which an integrated transmitter/receiver unit is applied. The reflection surfaces can also be employed both in the case of a separate receiver and a separate ultrasonic transmitter.

Figure 6:
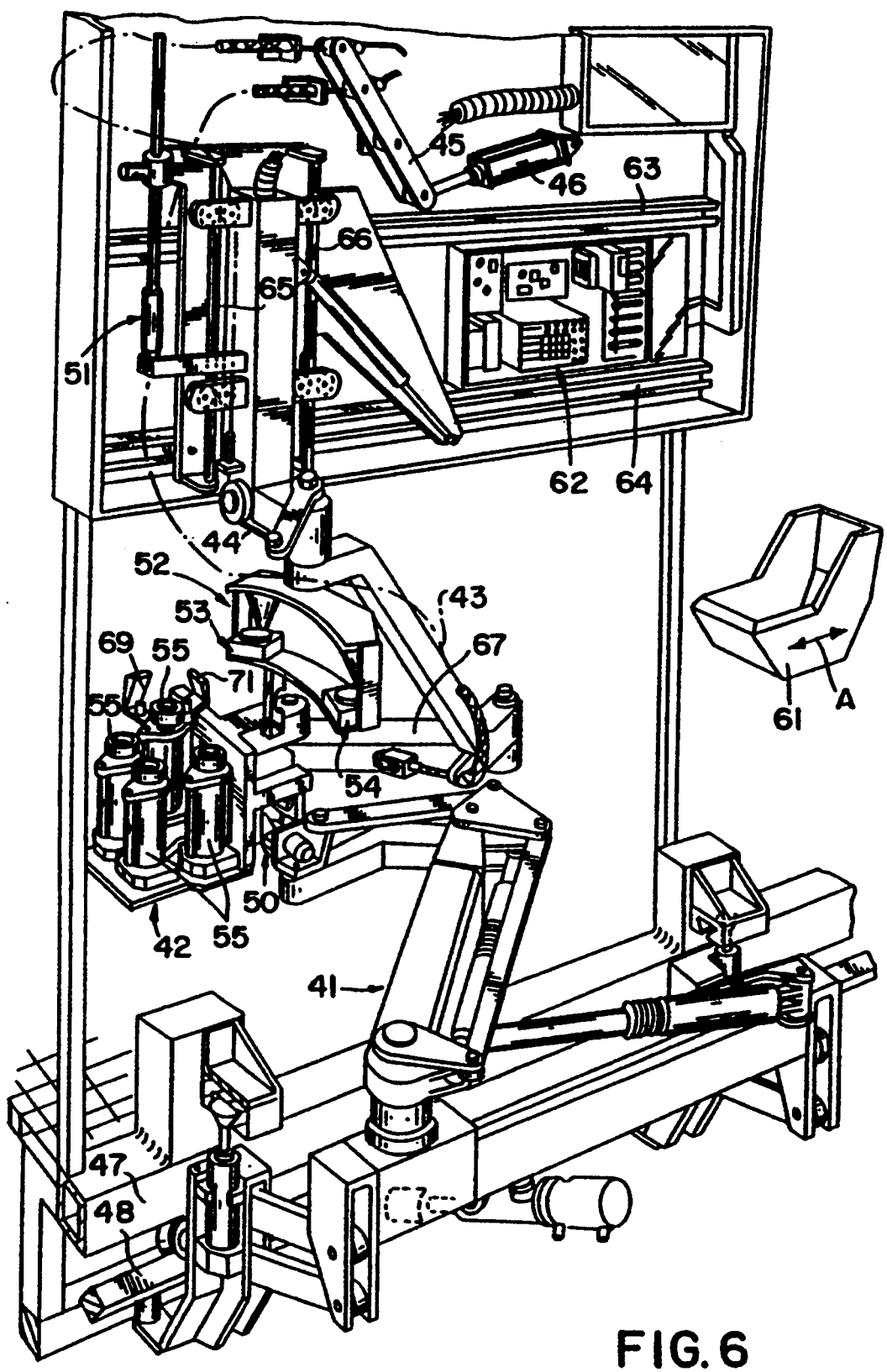
FIG. 6 shows a perspective view of a robot system for implementation of a part of a preferred embodiment of the method according to the invention.

A further preferred embodiment relates to a method and robot system for the milking of a cow (shown in FIG. 6). A robot system 41 comprising a number of arms pivotable relative to each other is movable along rails 47, 48 so as to be capable of performing search, find and/or following operations in different locations for the arranging of milking cups 55 of a milking rack 42 on a cow. The cow is directed with its head in the direction of a feed bin 61 so that its udder will be situated in the vicinity of a rest or start position of milking rack 42; feed bin 61 can be moved in accordance with arrow B so that the udder of the cow will usually be located in roughly the same or normal position relative to the milking rack 42, independently of the length of the cow.

The cow will usually be recognised automatically and information concerning its udder and teats will be available for instance in a central control means (not shown) provided with electronic hardware having software stored therein; from an energising member in cabinet 62 a mechanism 51 is driven (in a manner not shown) along upright rails 65, 66 so that the rest position of mechanism 51, and therefore of milking set 42, is preadjusted as far as possible subject to the size of the cow and the position of its udder. Further, movement in an upward direction is limited. Irrespective of the cow the mechanism 51 is set along the horizontal rails 63, 64 in a standard or fixed lengthwise rest position. Also driven from the electronics cabinet 62 is an actuator 46 which controls via a lever 45 two BOWDEN type cables which pull an arm to which the milking rack 42 is attached into a predetermined rest or zero position.

Fixed to the side of milking rack 42 is a sensor assembly 52 for the purpose of detecting, with the aid of two sensor units 53 and 54, a moving object, in the preferred embodiment shown a teat of a cow, in three dimensions in a horizontal plane and passing on information related thereto to a central control means (not shown). Additional sensor units 69, 71 can be disposed above each milking cup 55 of the milking set 42 in order to keep a teat centred relative to a milking cup as the milking cups move upward; for the sake of clarity such fine sensor units 69, 71 are only shown disposed by one milking cup 55. Like the sensor unit 52 these fine sensor units can be of an ultrasonic type.

A gripper member 50 of the robot 41 grips onto an opening of the milking rack 42 arranged for that purpose. The robot mechanism 41 is capable of moving the milking rack 42 in three dimensions, while the mechanism 51 can block changes of direction in a vertical direction; the electrical and program controls of the mechanism 41 and mechanism 51 are coupled to one another in a manner not shown.

Figure 7:
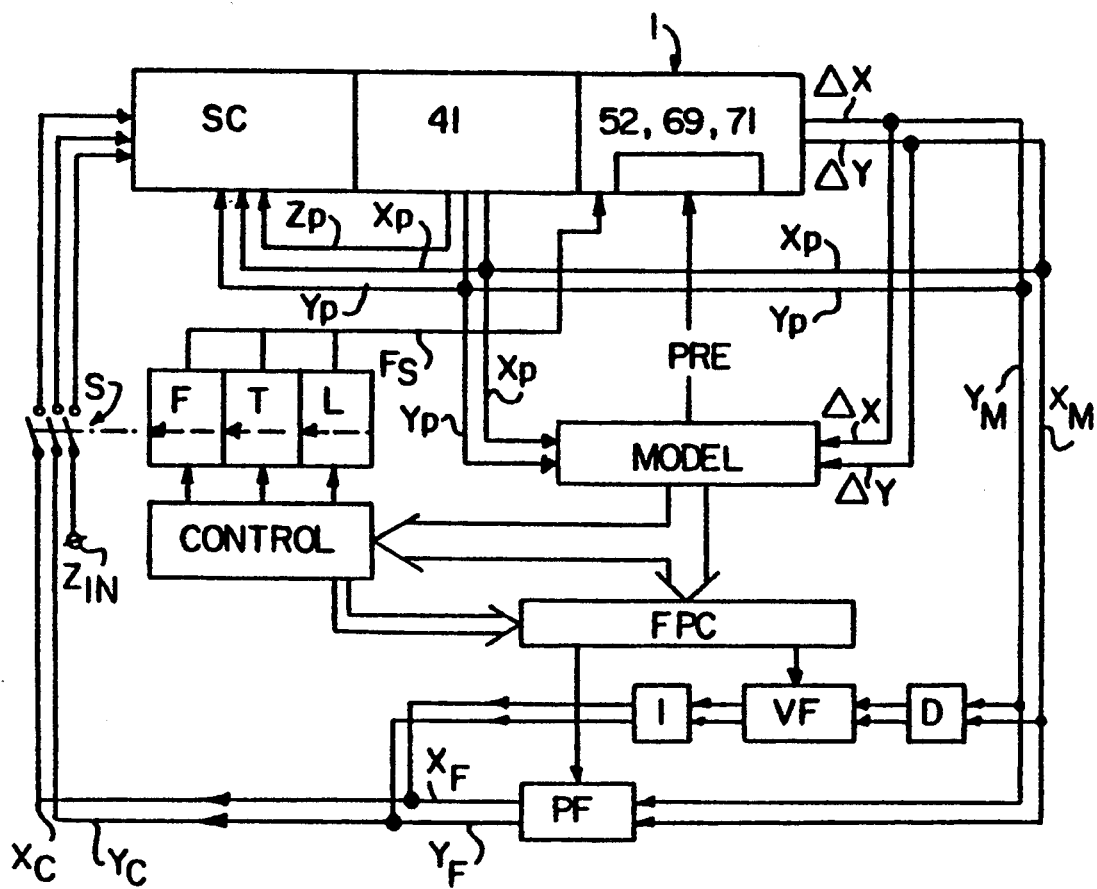
FIG. 7 shows a block diagram of the operation of the robot system from FIG. 6.
Figure 8:
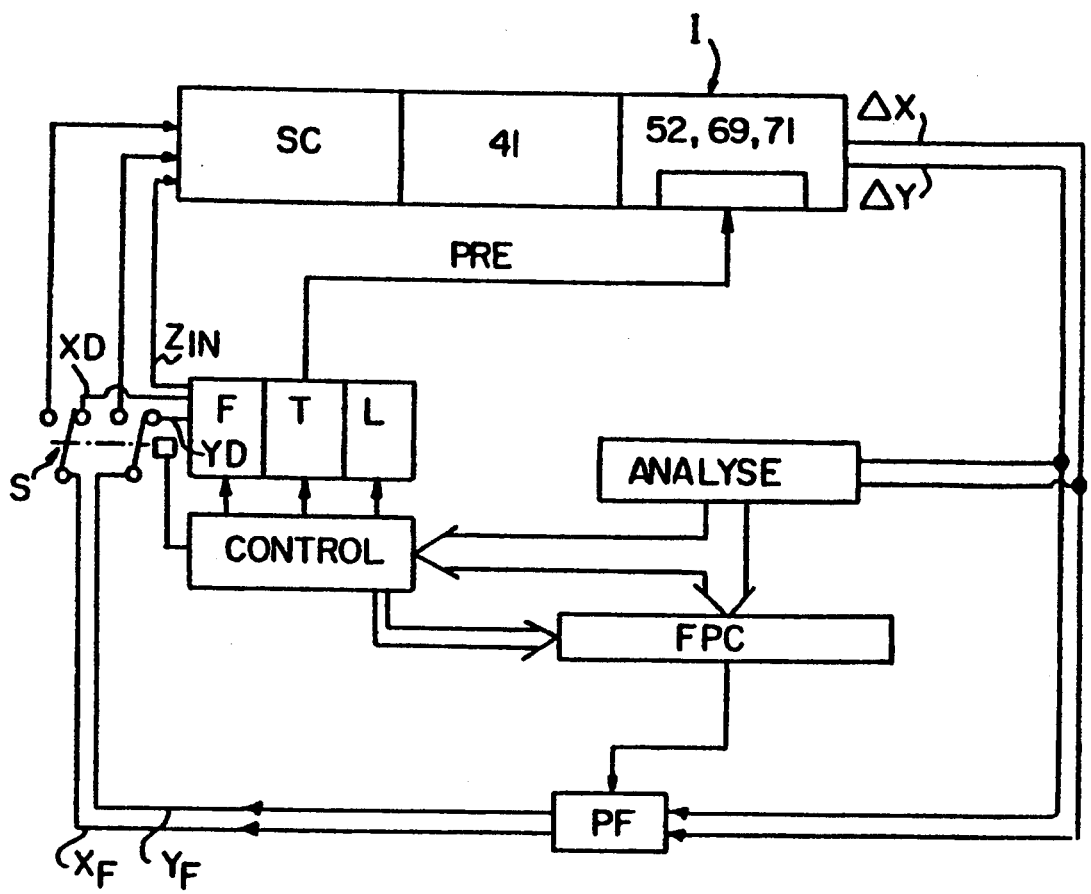
FIG. 8 shows a block diagram of another preferred operation of the robot system from FIG. 7.

The operation of the robot system from FIG. 6 is explained on the basis of the diagram from FIG. 7 (and later on the basis of the diagram from FIG. 8); the (moving) object, which in the shown preferred embodiment is the position of a teat of a cow, for example the teat at the front right-hand side of the cow, with respect to the relevant sensor, forms the input I for the sensors 52, 69, 71. The reflections measured by the ultrasonic sensors 52, 69, 71 are converted in generally known manner into sampled digital values in a horizontal plane, in FIG. 7 indicated with $\Delta x$ and $\Delta y$, these being relative position coordinates with respect to the sensors. Coming from the robot arm 41 are determined values $x_p$ and $y_p$, these being coordinates of the robot with respect to the neutral position of the robot, whereby $\Delta x$ and $\Delta y$—allowing for correction—must be added to them so that, as is indicated schematically in the figure, the value $x_m$ and $y_m$ result, these being the coordinates of the teat with respect to the neutral position of the robot. These values are corrected in a manner described later so that the values $x_c$ and $y_c$—the so-called target coordinates—result, which can be fed to a block designated schematically with SC to give to the robot 41 a new position towards which the latter must move the milking set 42.

The values $x_p$ and $y_p$ on the one hand and $\Delta x$, $\Delta y$ on the other are incorporated in a MODEL—which in the simplest case does not subject these said values to any processing whatever, i.e. it is transparent—whereby after statistical analysis, comprising for instance the determining of the mean or the standard deviation, a number of M values are filtered out from a series of N values (M<N). On the basis of the (modulated) values a prediction (PRE) can be made which is added to the controlling of the sensors in order to allow this PRE value to take the place of clearly erroneous values from the series of digitalized measurement values, in accordance with a predetermined criterion. In the MODEL a Z-transformation replaces the digitalized samplings in the case of the described embodiment, but such a MODEL can likewise be implemented with a so-called Kallman filter or in other manner. In FPC filter coefficients are determined in order to attribute a new value to the value $x_m$ and $y_m$ in FPC on the basis of the MODEL as well as to the value $v_{xm}$—after differentiation in t of the values $x_m$ and $y_m$—in order to add this filtered velocity value ($v_{xf}$, $v_{yf}$) after integration in (I) to the corrected filtered position value $x_f$ and $y_f$.

The described control loop of $\Delta x$, $\Delta y$ via $x_c$, $x_y$ to $x_s$, $y_s$ is either closed or not on the basis of the data from the MODEL, as passed on to as block CONTROL; only when predetermined criteria have been fulfilled with respect to mean value of $\Delta x$ over a determined time, mean value of $\Delta y$ over a determined time, standard deviations therein in addition to particular velocity values ($v_x$, $v_y$), is the control loop at S closed by a block designated FTL.

In the first instance the control loop at S remains opened since from a block F, in a manner generally known in robot control, a global positional control is performed of the robot system 41 to a teat of a cow using information stored in a memory. If the sensor unit 52—sensor units 69, 71 are not used in these so-called find-modes—detects a moving object and predetermined criteria with respect to $\Delta x$, $\Delta y$, vx, vy and standard deviations thereof are satisfied, the control is taken over in a block T and the above criteria, which the above information must satisfy at an increased sampling speed, are made more stringent.

If the more stringent criteria are satisfied for a predetermined time, the control loop at S is closed and the values $x_c$ and $y_c$ are fed directly to the servo-control (SC). If required the filter coefficients computed from the MODEL can be replaced by filter coefficients provided from the control means (CONTROL), these coefficients having a fixed value for a determined time duration, after which the coefficient computation from the MODEL will determine the position to which the robot arm is sent. Computations in CONTROL are dependent on the mode of the system.

If for a predetermined time duration the criteria from block T are satisfied, the described control loop remains closed and block L takes over the controlling, whereby, as is indicated via line FS, it is possible to switch over to fine sensor units 69, 71 so that the position of the milking cup relative to the teat can be determined (still) more accurately using any required correction by the fine sensor units, and the relevant milking cup 55 can be arranged if for a predetermined time the teat remains centred with respect to the milking cup and therefore the sensor units.

After arrangement of the milking cup, a switch back is made to the T-mode until another teat of the cow is centred, following which this milking cup can also be arranged in the L-mode.

It will be apparent that in the case of unexpected movements of the (moving) object the described robot system will change over instantly from L-mode control to T-mode control or even to F-mode control.

A diagram of another preferred embodiment of the operation of the robot system from FIG. 6 (FIG. 8) requires no velocity filter and only the values $\Delta x$ and $\Delta y$ are hereby analyzed, while the MODEL forming is omitted. Prediction values are fed via block CONTROL to the sensor block 52, 69, 71.

It is further noted that the Z coordinate or height coordinate of the teat of the cow will usually be constant and in the embodiment shown will have a value that is fixed or determined by the CONTROL block. In the case of the embodiment shown in FIG. 8 the filter coefficients are constant in a particular situation of the system (F-, T- or L-mode), but they have a different value for each situation, Extensive analyses and evaluation of tests have shown that with sampling at 20 Hz of the signals from the sensor assembly 52 and sensor units 69, 71 an accurate model of the movements of a teat of a cow can be built up; the controlling of the robot arm via the servo-control takes place in the preferred embodiment shown every 5 msec. In view of the possibility of switching between different movement modes, this has been found in practive to be amply sufficient to be able to follow a teat of a cow and arrange or attach the miling cups in a precise manner.

A robot installation 101 (FIG. 9) or similar installation for automatic arrangement of milking cups 102 on the udder of a cow and the subsequent removal of milk is described in the above mentioned patent applications of the same applicant. The pivotable robot arm 103 is automatically controllable using an ultrasonic sensor unit 106 according to the present invention which is disposed centrally on a milking set 107.

Ultrasonic sensor assembly 106 (FIG. 10) comprises an ultrasonic sensor unit 108 which transmits and receives ultrasonic waves in accordance with arrows D. Disposed above the ultrasonic transducer 108 is an ultrasonic mirror 109. This ultrasonic mirror 109 is arranged in a hollow tube 111 which can be driven using a gear transmission 112 by a schematically indicated electric motor 113. A post or support 114 is in fixed connection to the milking set 107 and provided with terminals 116 and 117 for electrical connection of the transducer 108. The tube 111 is rotatable about post 114 via schematically indicated bearings 118, 119.

Figure 9:
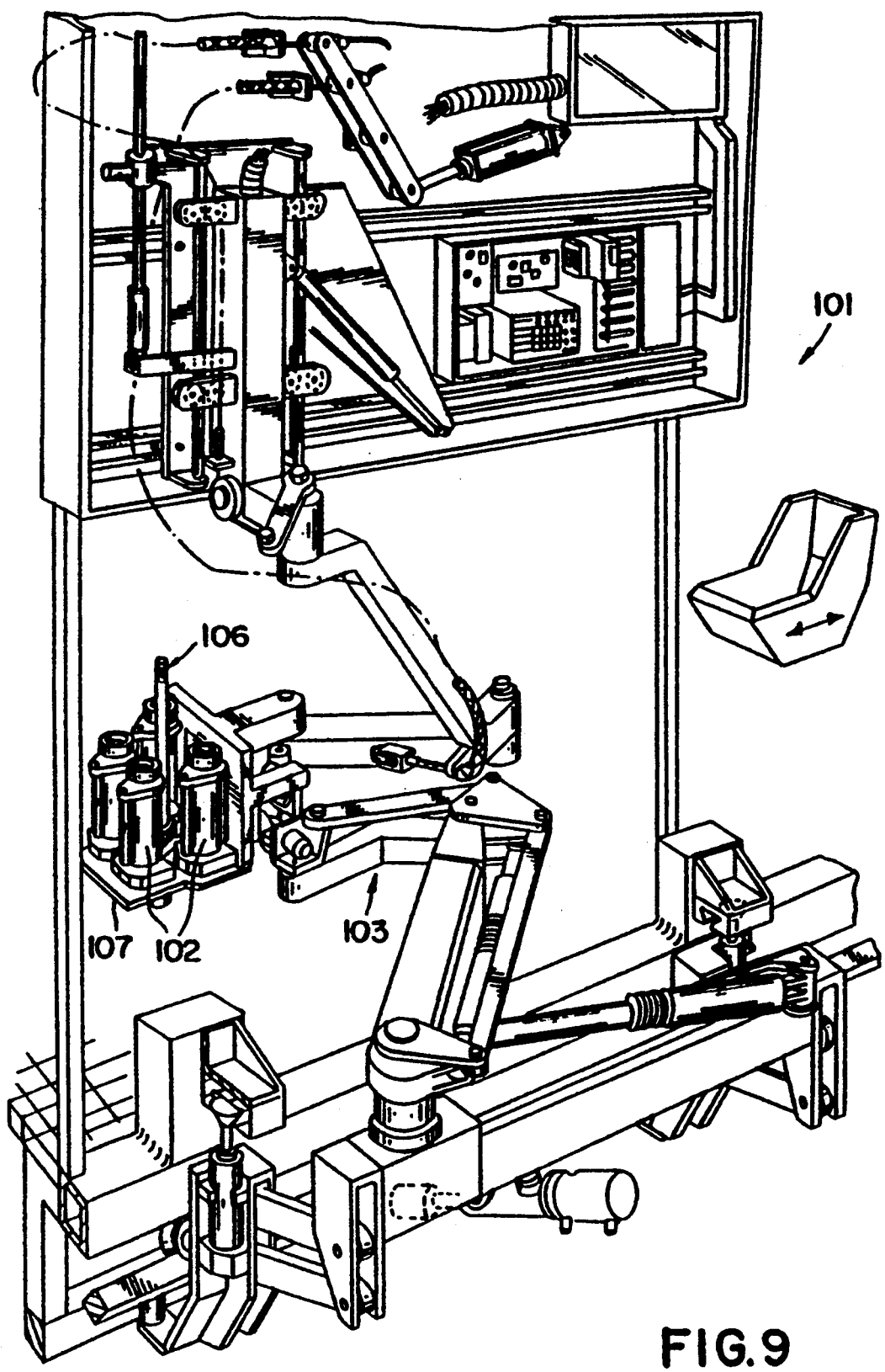
FIG. 9 shows a perspective, partly broken away and partly schematic view of an automatic milking device provided with a preferred embodiment of an ultrasonic sensor unit according to the present invention.

The electric motor can be driven electrically such that the tube 111 and therfore the mirror 109 turn completely round and therefore a circular or control area around the transducer is scanned. This will be the case if the mutual positions of tests 121 of the udder 122 of a cow (not shown) have to be determined. If an udder or teat of a cow has to be traced from a position as shown in FIG. 9, the tube 111 can for example only be turned by the electric motor 113 back and forth through a limited angle, so that a limited control or circle segment is scanned, in which circle segment the udder or teat can be expected to be because of the known, determined position of the cow.

Figure 10:
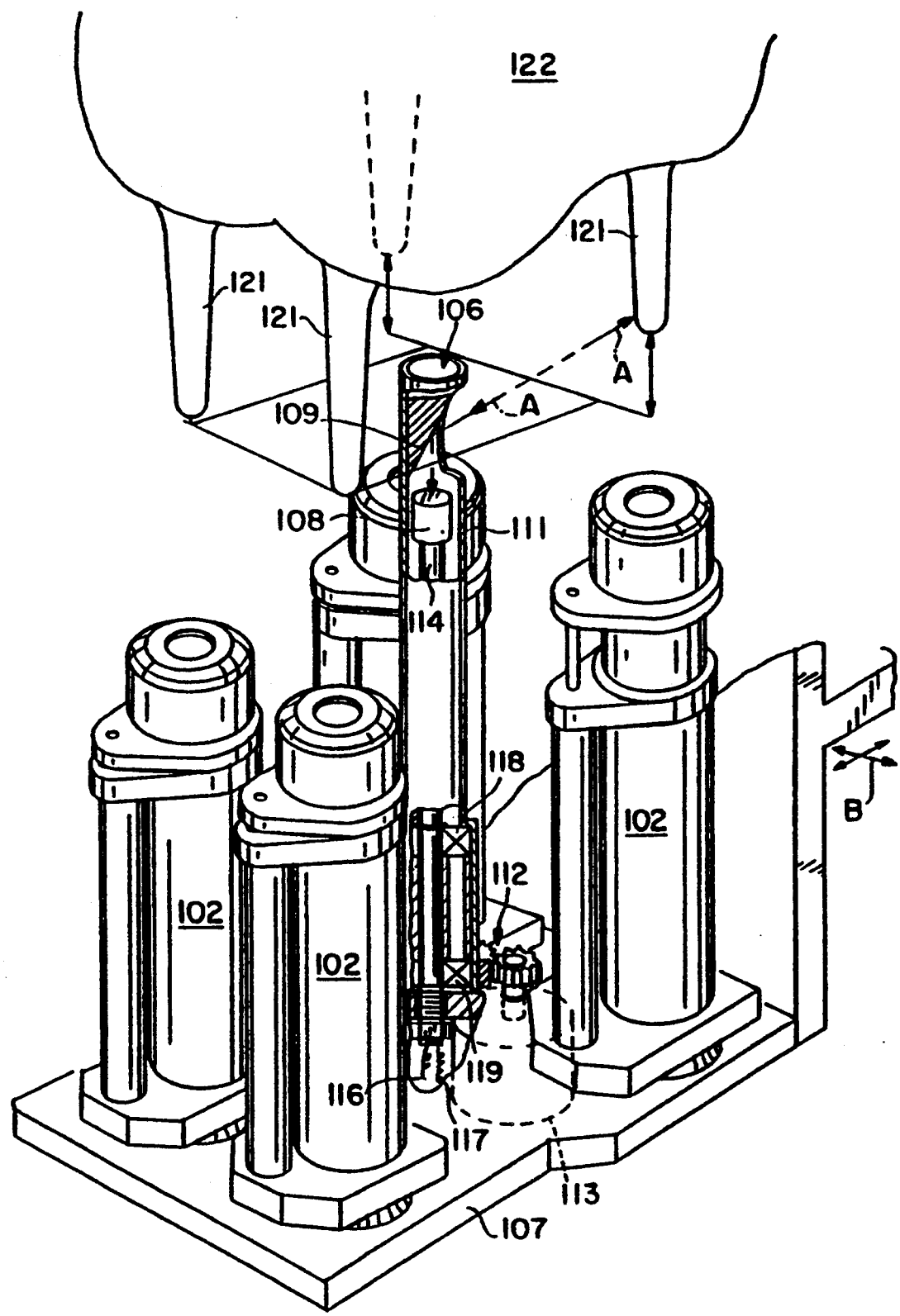
FIG. 10 shows the sensor unit, in more detail, beneath the udder of a cow.

In the position shown in FIG. 10—a view from the hind side of the cow—the milking cup on the front right-hand side of the milking set 107 is carried or pushed upward and the tube 111 will become virtually stationary relative to transducer 108 so that the test 121 on the front righthand side of the udder 122 is continually detected by the ultra-sonic transducer 108. If a deviation is detected in the correct position of the teat 121 relative to the cup 102 the milking rack 107 can usually be adjusted instantly as according to arrows E, this substantially two-dimensionally, Another preferred embodiment of an ultrasonic sensor unit 126 (FIG. 11) according to the present invention is attached using a one-piece spring 127 to a supporting construction 128 of a rack 129 for four miling cups which are omitted for the sake of clarity. Only the points of attachment 131 for the milking cups to a tray 132 are shown. The tray 132 is fixed for limited movement to the supporting construction 128 with springs 133 and screw bolts 140. The sensor unit 126 protrudes from the side between the milking cups (not shown). Using socket head screws 134 and slots 135 a housing 136, and with it an ultrasonic mirror 137, can be adjustably fixed in position relative to a connecting piece 138 and therefore the supporting construction 128. In addition an electric motor 139 is fixed in position in the housing 136 with a screw bolt 141; a gear ring 143 engaging a driving gear wheel 142 and firmly joined to the ultrasonic mirror 137 is thus coupled in housing 136 to the electric motor 139. Further disposed in the housing is an upward facing transducer 144 with a schematically indicated connection 146. The ultrasonic waves are transmitted according to the dashed and dotted line F.

As can be seen in FIG. 12 the ultrasonic mirror may take a form that is slightly concave in the vertical direction, and in the horizontal direction (FIG. 11) so that in addition to being reflected by the mirror the ultrasonic waves are also focused. If the ultrasonic bundle has to diverge, the ultrasonic mirror face can take a slightly convex form.

The electric motors 113 and 139 preferably take the form of so-called step motors so that the position and the angular rotation of the ultrasonic mirror face are not measured or computed from the time of revolution, but the position is available directly at the output of the step motor.

In accordance with the embodiments of the present invention both distance and direction of a (moving) object relative to the fixed transducer are measured in simple manner.

In another preferred embodiment of an automatic milking system (FIG. 13) a moveable robot arm 201 is used to service milking locations 202 where the cow is retained in exact positions by means of positioning elements 203 and moveable feeding containers 204.

Figure 20:
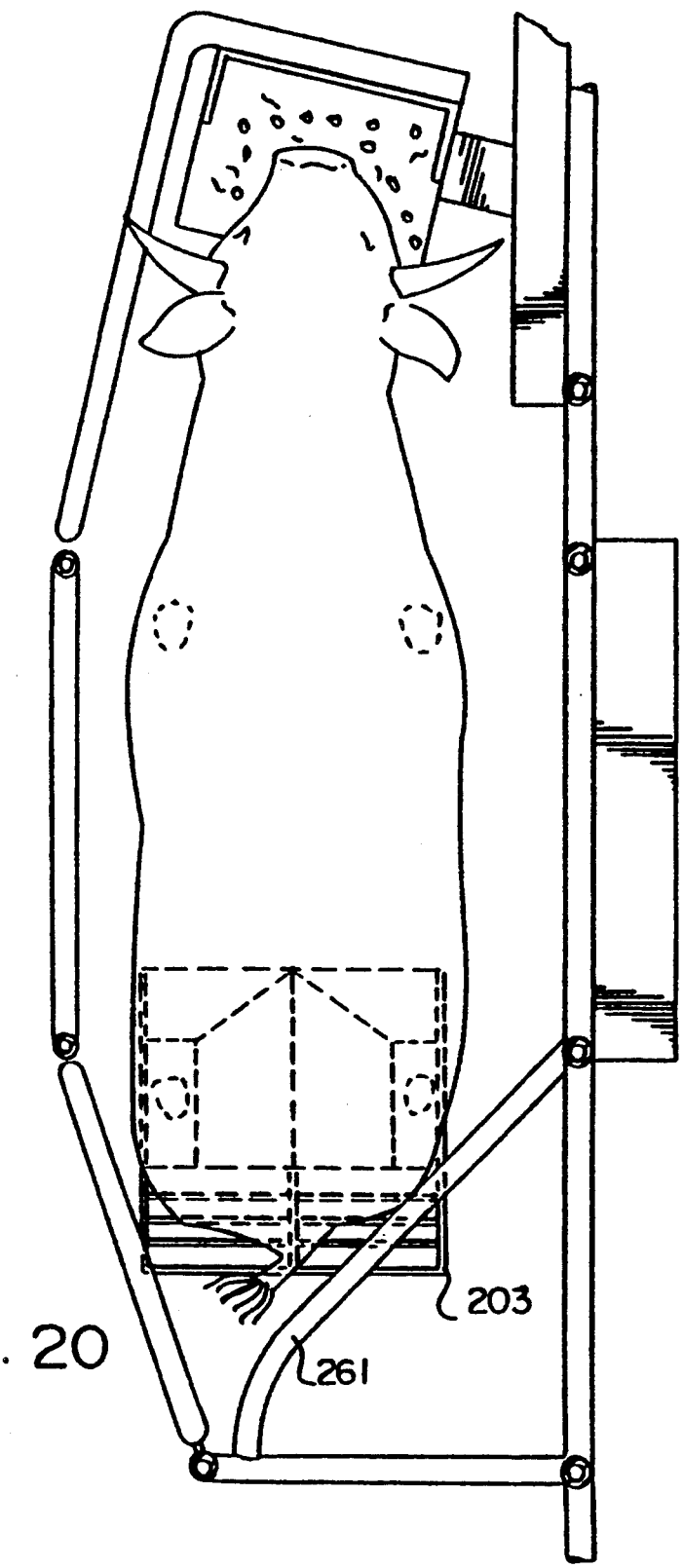
FIG. 20 a top view of a positioned cow.

A cow (FIG. 20) is forced to stand still on her right hind hoof by means of a solid bar 261 for pushing the weight of the cow to its other hind hoof such that an arm of a milking rack can be moved to the udder of the cow.

Figure 14:
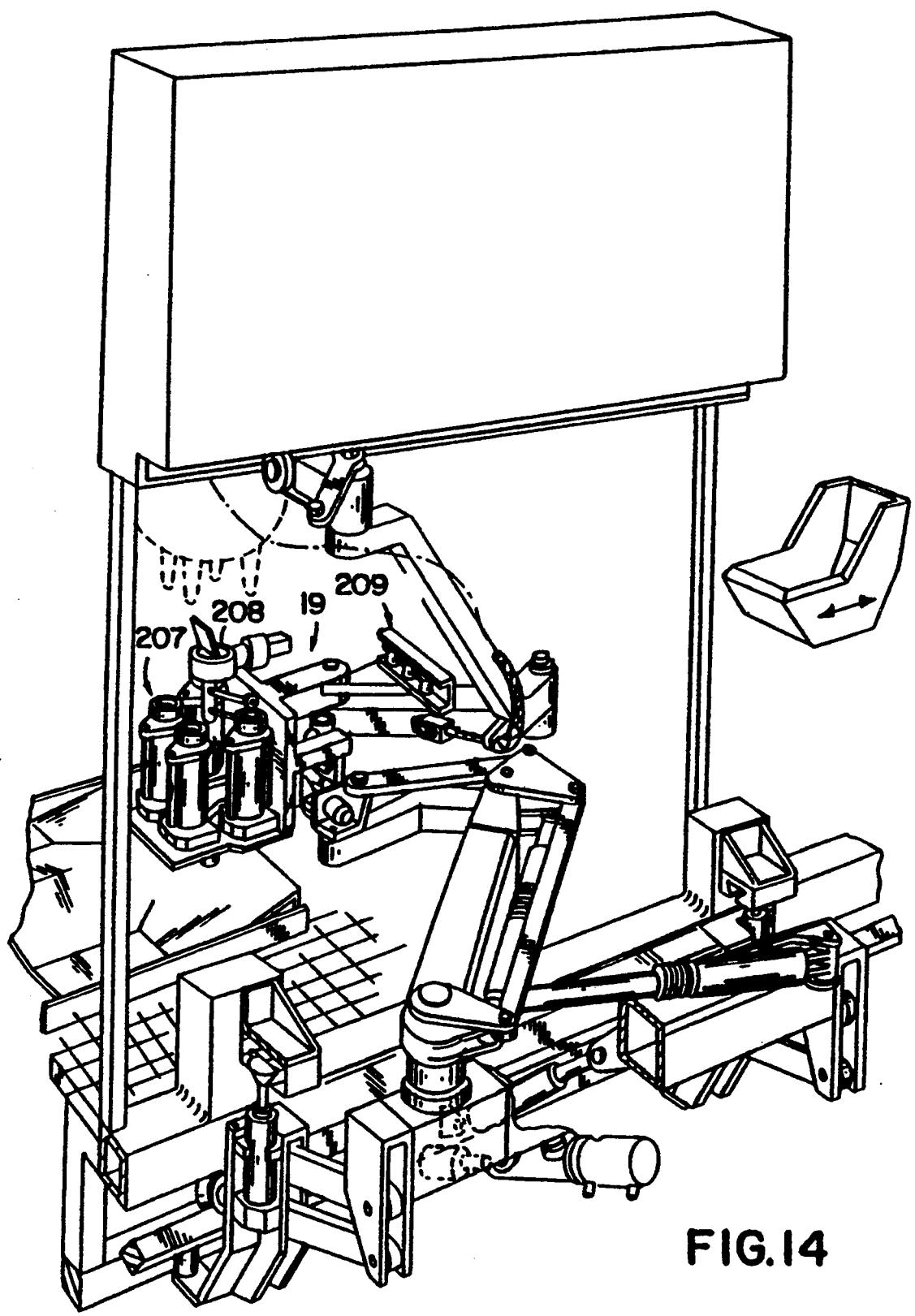
FIG. 14 shows a perspective view of detail XIV of FIG. 13.

In more detail (FIG. 14) it is to be seen that one the center of the milking rack 207 a rotating scanner 208 is installed and a detector unit 209 is disposed besides the milking rack.

Figure 15:
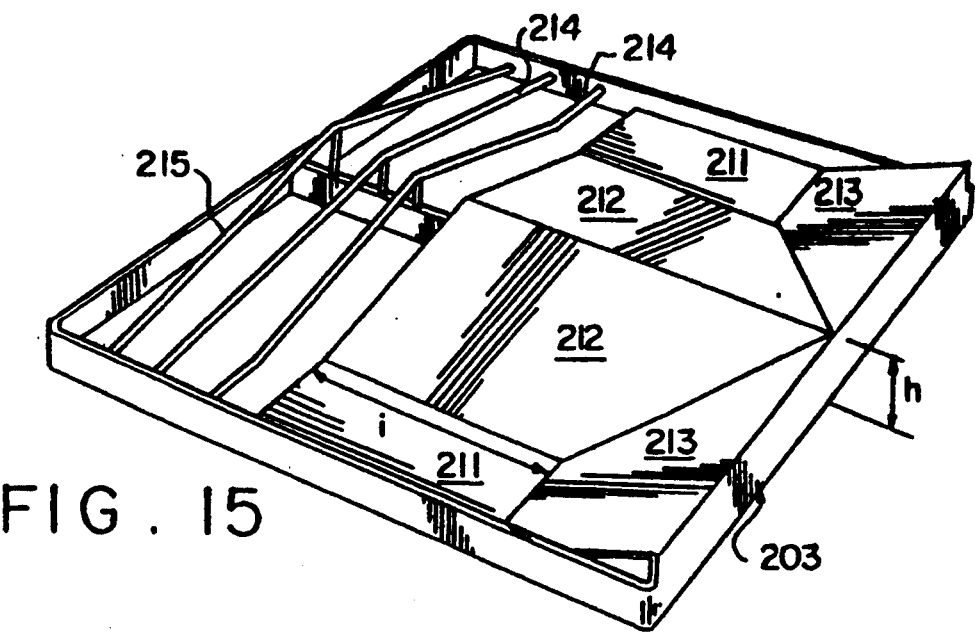
FIG. 15 shows a perspective view of detail XV of FIG. 13.

A positioning element 203 (FIG. 15) comprises preferably retaining surfaces 211 for retaining the hind hooves of a cow and inclided surfaces 212, 213 respectively to prevent the cow from moving her paws from the retaining surfaces in sideward and forward directions, respectively the hind part of the positioning element is provided with bars 214, 215 which will prevent the cow from moving her hoof in a backward direction and will allow excrement of the cow to fall through. The sidewardly inclined surfaces 212 extend to a height approximately 70 mm above the ground level without providing a flat surface for the cow to stand on. This is however low enough to allow the robot arm to go to the udder of the cow. The length 1 is approximately 300 mm viz. approximately two times the length of a hoof. Preferably the rear bar 215 has a higher distance from the ground than the bars 214, such as to prevent the cow stepping backwardly.

Figure 13:
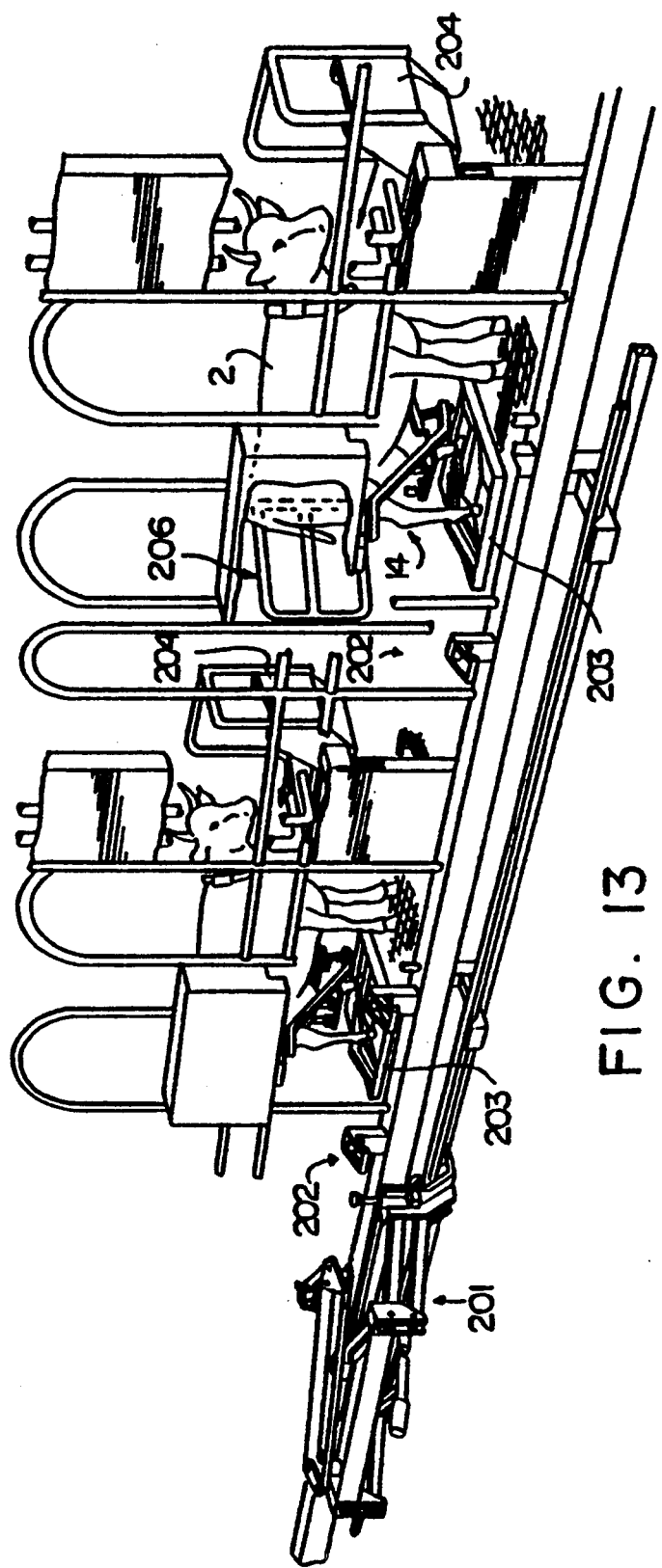
FIG. 13 shows a perspective view of an arrangement for automatically applying teat cups to cows.
Figure 16:
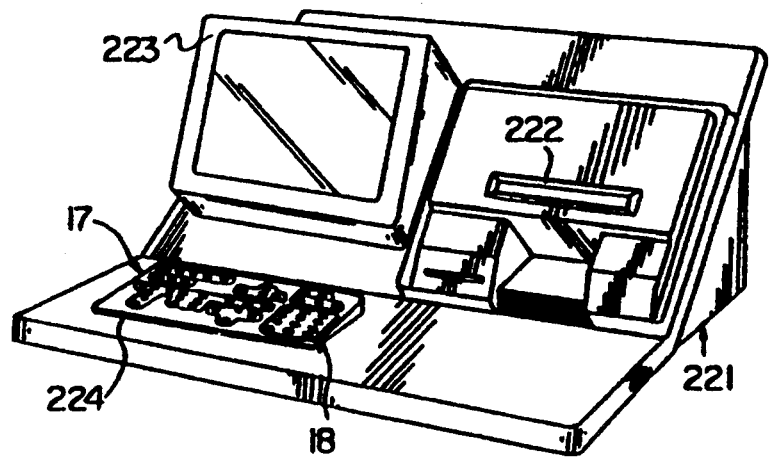
FIG. 16 shows a perspective view of a terminal apparatus to be used at a milking system of FIG. 13.
Figure 18:
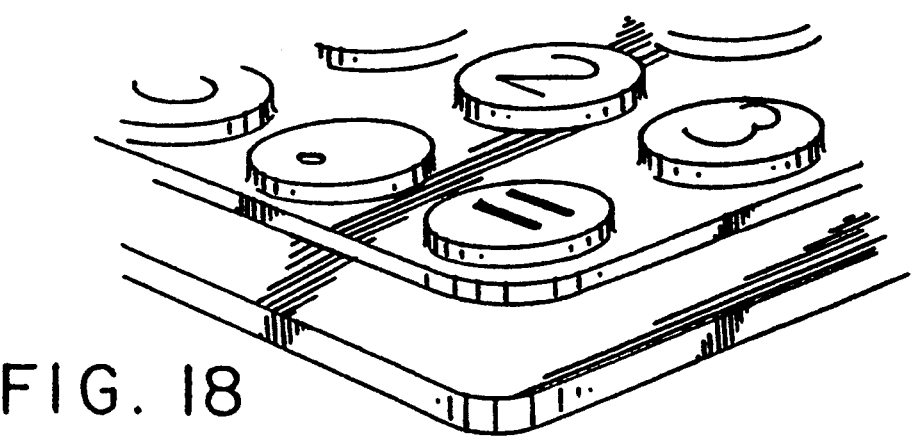
FIG. 18 shows in more detail detail XVIII of FIG. 16.
Figure 17:
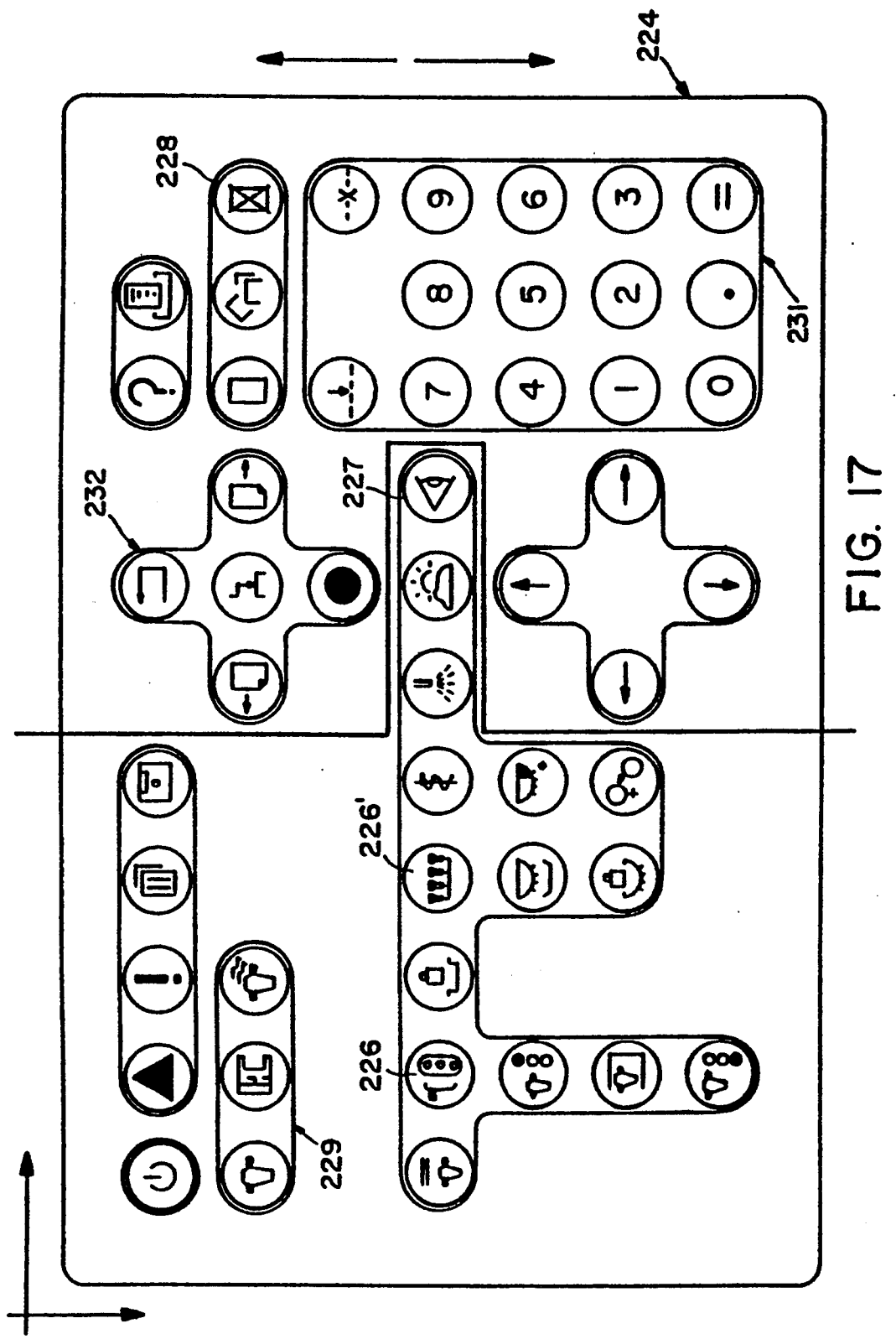
FIG. 17 shows a top view of detail XVII of FIG. 16.

An automatic milking system, e.g. such as shown in FIG. 13, is preferably controlled by means of a terminal control unit 221 (FIG. 16) provided with a slot 222 for inserting a floppy disc, a screen 223 and a especially designed keyboard 224.

The keyboard 224 is preferably provided with functional keys such as 226, 227 and 228. Those groups are preferably in groups such as 229, 231 and 232 which contain indicia thereon to indicate various functions. Key 226' will e.g. control, after pressing this key, the applying of teat cups to a cow.

As the cows will be provided with means for automatically recognizing them, a complete history of the cows can be stored in a memory, e.g. on a floppy disc.

The keyboard 224 can easily be designed from a standard available keyboard, such as from a IBM or compatible computer. The farmer, however, will not be bothered by learning difficult codes, e.g. from three letters, by heart; as the function keys preferably are provided with pictograms.

In the preferred embodiment of FIG. 13, using a positioning element 203 and a feeding container adjustable relative to the length of the cow, the position of the udder and test to be found are within a 'window' of approximately 30×40 cm$^2$. Tests in this respect were done and even in the situation that test positions of cows were unknown to a computer before entering a milking location, the detection unit 209 (FIG. 14, 19A, 19B) was able to pick up the position of a teat inside that 'window'.

Preferably the detector unit 209 consists of transducer 210, 210' resp. provided above conial surfaces 233, 234 reap., such that no dirt will fall on the transducing surfaces.

The robot arm will move the milk rack 236 to the 'window' or area in which the udder will be detected. Firstly the right teat T at the front will be searched by moving the milk rack and sensor unit 209 up and down. By analyzing the sample data from the sensor unit 209 it can be established that this right front teat T has been found.

The size of the 'window' through which a sensor can 'look' can be changed dependent on the information received. Information from outside the 'window' can be disregarded.

Afterwards a rotating scanner 237 will take over controlling the position of the milking rack. This rotating scanner will then be under the udder in between the tests. Under control of this rotating scanner 237 the teat cups are connected to the teat one at the time, as described in the prior art.

When a teat cup is connected in the right way, this fact will be sensed by a sensor in a vacuum line of the milking system. Teat cups 238 are preferably provided with flexible skirts 239 such as to prevent sucking air from the environment, which would disturb the ultrasonic detector units 209 and 237.

The sensor unit 237 is disposed to the milking rack through legs 241 connected to bearings 242, 243 respectively, and can be moved up and down by means of a pneumatic cylinder 244.

A milking platform 246 as well as a connecting arm 247 are connected to the frame 248 of the milking rack by means of springs 249, 251 resp. In the unlikely event that the cow will put her right hindleg on the milking rack, this milking rack will give away and will be disconnected automatically.

Figure 19A:
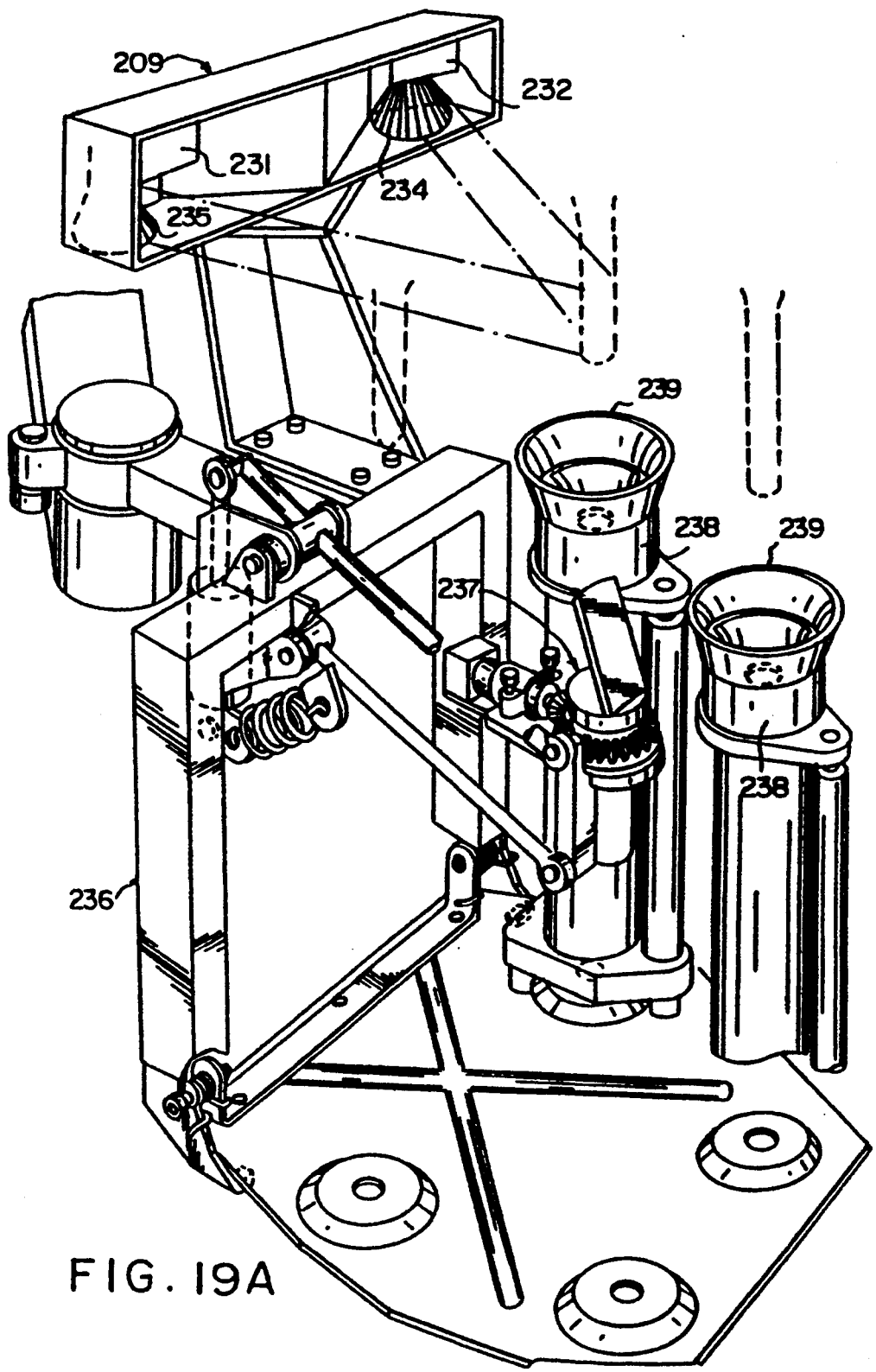
FIG. 19A and 19B show respective perspective views of a detection arrangement for automatically applying teat cups into respective positions.
Figure 19B:
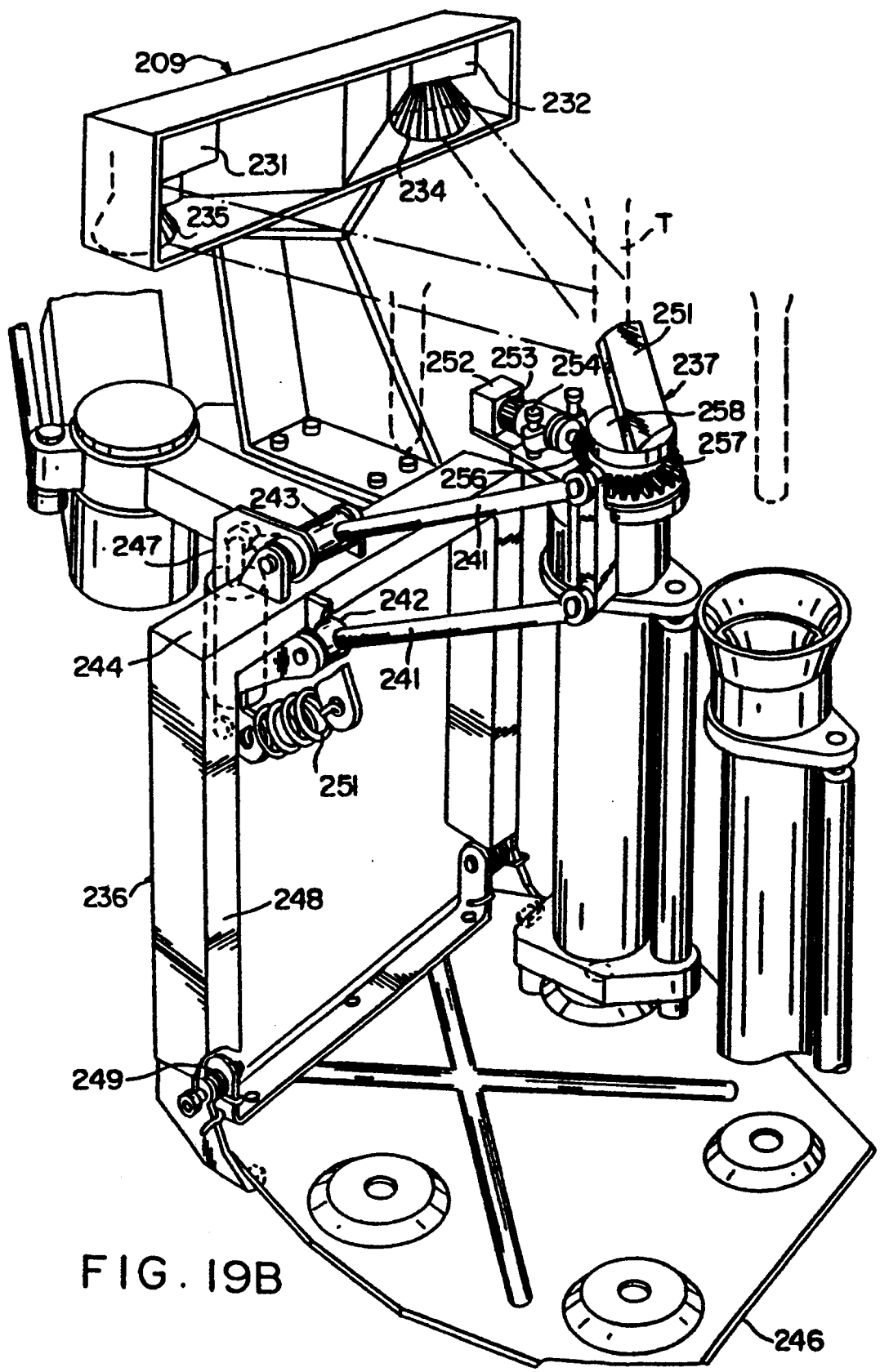

In the preferred embodiment of FIG. 19A and 19B a reflecting surface 237' of the unit 237 can be rotated at approximately 167 rpm. The sensor unit 237 further comprises encoding means 252 connected—not shown—to the computer, an electric motor 253, gearing 254, bevel gear 256 and a crown wheel 257. Under the rotating mirror 237' a transducing surface 258 is disposed, from which also detected reflections are transmitted to data processing equipment of the computerized controlling unit (not shown). The transducer uses a frequency of approx. 400 kH, such that it is not disturbed by noise from the environment. Through the high revolution speed of the mirror a focussing effect for the mirror is achieved.

We claim:

1. An automatic milking device for milking a cow located within a defined area said device for engaging the teats on the cow's udder, said teats and udder being randomly movable with movements of the cow within the area, comprising:
   a plurality of milking cups to be placed around the teats on the udder of the cow;
   a robot arm carrying said cups and for moving said cups into operative position with respect to the teats;
   control means for controlling the movement of the robot arm, said control means including apparatus for automatically searching for, finding, following and locating the teats for engagement with the cups carried by the robot arm including a sensor for sensing the position of the teats with respect to said sensor; means responsive to the sensor for producing sensed position information of the teats with respect to a reference; means for modeling expected position information of the teats with respect to the reference, said means for modeling selectively using a search routine for selecting an accepted as valid earlier sensed position information; means for choosing as valid based upon selected criteria either the sensed position information or the expected position information; and means for causing the robot arm to move to a desired position relative to the teats in response to said selected valid position information; and
   a terminal for providing control information to the robot arm including input means for applying said milking cups to the teats and providing reference data unique to each cow.

2. The apparatus of claim 1 further comprising:
   means for statistically analyzing the information relating to the sensed position of the teats; means responsive thereto for determining the accuracy of the information as a result of such statistical analysis; and means responsive to the accuracy of the information for substituting accurate information for sensed information.

3. The apparatus of claim 1 wherein the control means further includes an open loop control for the robot arm responsive to stored predetermined position and velocity information.

4. The apparatus of claim 1 wherein the control means further includes a closed loop control for the robot arm being responsive to selected position and velocity information for controlling the robot arm for a predetermined time and recomputing the position information after each predetermined interval.

5. The apparatus of claim 1 comprising a plurality of modes of operation for the control means including a T mode for tracking the teats, an L mode for locating the robot arm with respect to the teats and an F mode for finding the object.

6. The apparatus of claim 5 comprising means responsive to the teats for selecting the mode in accordance with preselected criteria.

7. The apparatus of claim 6 wherein the criteria establish increasing requirements each mode from minimal requirements in the F mode, to more selective requirements in the T and E modes respectively.

8. The apparatus of claim 7 including means for selecting more restrictive modes in response to the absence of movements of the teats and the cow, over selectively increased time intervals.

9. Apparatus as set forth in claim 1 wherein the selected criteria for choosing as valid either the sensed position information or expected position information are dependent on an historically acceptable rate of valid sensed position information.

10. An automatic milking device for milking a cow located within a defined area said device for engaging the teats on the cows under, said teats and udder being randomly movable with movements of the cow within the area, comprising:
    a plurality of milking cups to be placed around the teats on the udder of the cow;
    a robot arm carrying said cups and for moving said cups into operative position with respect to the teats; and
    control means for controlling the movement of the robot arm, said control means including apparatus for automatically searching for, finding and following the teats with respect to the udder including a sensor mounted on the robot arm for movement therewith for sensing the position of the teats in at least one dimension with respect to a reference; means responsive to the sensor for producing sensed position information of the teats with respect to the reference; means responsive to the sensed position information for analyzing the position of the teats with respect to the robot arm for producing corrected position information for governing the robot arm including means for modeling expected position information of the teats with respect to the reference and selectively using a search routine for selecting an accepted as valid earlier sensed position information; means for choosing as valid, based upon selected criteria, either the sensed position information or the expected position information; means for causing the robot arm to move to a desired position relative to the teats in response to said selected valid position information; and a terminal for providing control information to the robot arm including input means for applying said milking cups to the teats.

11. An automatic milking device for milking a cow located within a defined area said device for engaging the teats on the cow's udder, said teats and udder being randomly movable with movements of the cow within the area, comprising:

a plurality of milking cups to be placed around the teats on the udder of the cow;

a robot arm carrying said cups and for moving said cups into operative position with respect to the teats; and control means for controlling the movement of the robot arm, said control means including apparatus for automatically searching for, finding, following and locating engaging the randomly movable teats with said robot arm, including a sensor for sensing the position of the randomly moveable teats in at least one dimension with respect to a reference; means responsive to the sensor for producing position and velocity information; means for modeling the movement of the randomly moveable teats with respect to the robot arm being responsive to the sensed position and velocity information for calculating a predicted position and velocity of the teats and producing corrected position and velocity information for governing the robot arm; means for causing the robot arm to follow the randomly moveable teats in response to the corrected position and velocity information of said object, said means selectively operable in a T mode for tracking the teats, and L mode for locating the robot arm with respect to the teats and a F mode for finding the teats; and means operatively coupled to the means for selecting the T mode, the L mode and the F mode of operation.

12. An automatic milking device for milking a cow located within a defined area said device for engaging the teats on the cow's udder, said teats and udder being randomly movable with movements of the cow within the area, comprising:

a plurality of milking cups to be placed around the teats on the udder of the cow;

a robot arm carrying said cups and for moving said cups into operative position with respect to the teats; and control means for controlling the movement of the robot arm, said control means including apparatus for automatically searching for, finding, following and locating the teats on the udder of the cow with said robot arm in response to the position of the teats, including a sensor for sensing the position of the randomly moveable teats in at least one dimension with respect to a reference; means responsive to the sensor for producing position and velocity information regarding the teats; means for modeling the movement of the teats to produce a calculated prediction of the position of the tests with respect to the robot arm, means for storing data establishing a nominal position of the teats and means for modeling being responsive to the sensed position and velocity information for producing corrected position and velocity information regarding the robot arm; means for causing the robot arm to follow and engage the randomly moveable teats selectively in response to the stored data and the corrected position and velocity information, said control means selectively operable in the plurality of modes including one mode based upon the stored data and operable in another mode based upon the corrected information; means responsive to the difference between the stored data and the corrected information and being operatively coupled to the control means for selecting the mode of operation based upon said differences; and a terminal for providing control information to the robot arm including input means for applying said milking cups to the teats and providing reference data unique to each cow.

* * * * *